Feb. 2, 1937. G. HURST 2,069,494
MEASURING DEVICE
Filed June 8, 1936
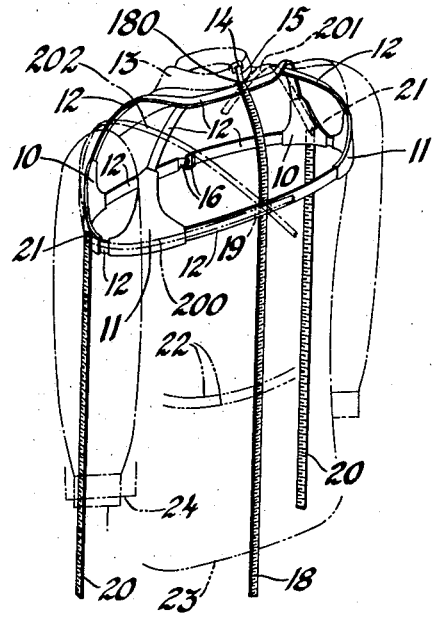
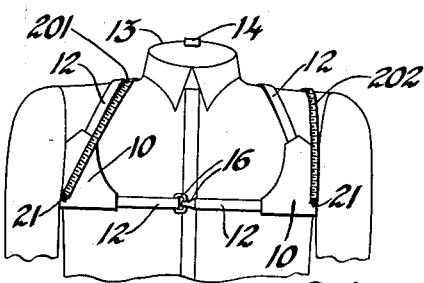
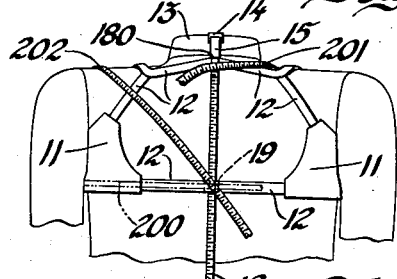
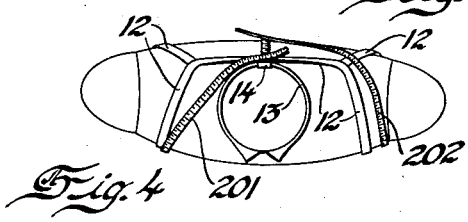
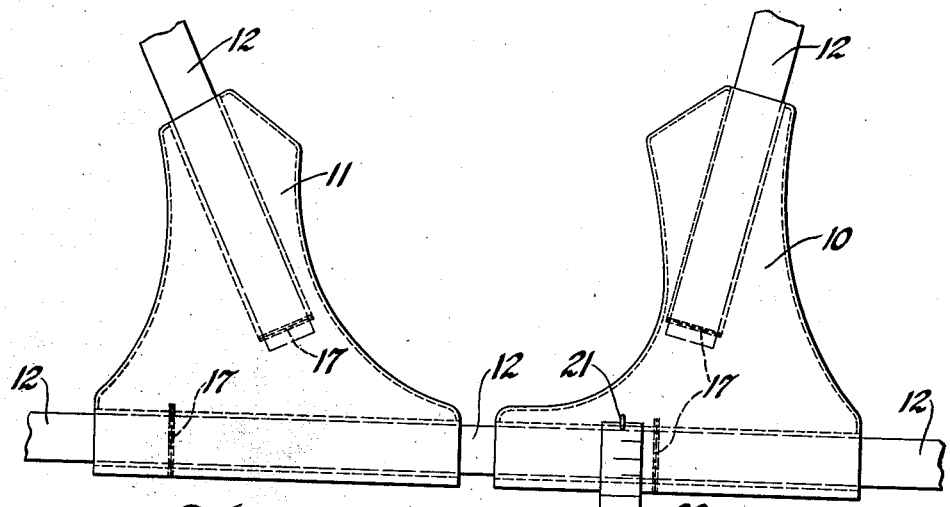
INVENTOR.
George Hurst
BY Everett G. Wright
ATTORNEY.

Patented Feb. 2, 1937

2,069,494

UNITED STATES PATENT OFFICE 2,069,494

MEASURING DEVICE

George Hurst, Detroit, Mich.

Application June 8, 1936, Serial No. 84,093

2 Claims. (Cl. 33—2)

This invention relates to a method and means for correctly taking the measurements of a subject from which a coat pattern may be accurately drafted which precisely allows for the posture and physical attitude of the subject to be fitted.

It is customary to take four general measurements of a subject from which a coat is cut and made on the basis of "proportional measures". That is, the chest measure, waist measure, coat length and sleeve length are taken from which a pattern is drafted, cloth cut from the pattern and the coat tailored, a "standard table of proportional measures" based on average subjects of average posture and physical attitude being used to determine the detail measurements required to draft the pattern and tailor the coat. A great loss in time required for fittings and alterations, poorly fitted garments and dissatisfied customers are among the usual results of the customary method of taking measures and drafting patterns on the "proportional" basis because of the fact that the actual posture and physical atitude of a subject is not as contemplated by the "standard table of proportional measures". The applicant has found from experience eighty percent of the subjects are not within the range of the "proportional measures" based on average subjects of average posture and physical attitude.

It has been found by the applicant that a pattern for a coat may be accurately drafted from the customary general measurements coupled with certain "short measures" and that a coat cut and tailored from such a pattern will be adjusted and proportioned to any irregularities in the postural and physical attitude of a subject, require a minimum of alteration time and be completely satisfactory to the customer.

The present development in the novel method and means for accurately taking the general measurements coupled with certain "short measures" comprising the arm scye depth, location of waist line, length of coat, sleeve length, blade, strap and overshoulder measures assures the customer of a perfectly fitting garment commensurate with his postural and physical attitude. The total cost of tailoring and fitting coats has been materially reduced in the case of over eighty percent of the subjects to be fitted by use of this invention.

The main object of this invention is to provide a simple method and means for taking general and short measurements of a subject for producing coat pattern drafts which allow for the postural and physical attitude of the subject to be fitted.

Another object of this invention is to provide a means by which a plurality of measurements for tailoring a coat may be taken with expert accuracy by a person other than a tailor and yet reveal to a cutter unerringly the actual posture and physical attitude of the subject to be fitted.

Another object of this invention is to provide means for taking a plurality of measurements for tailoring a coat which automatically reveal the postural and physical attitude of the subject to be fitted.

Other objects of this invention will become apparent by reference to the following detailed description taken in connection with the accompanying drawing. in which:

Fig. 1 is a phantom view in perspective of a measuring device embodying the invention positioned on a form showing the use of the device on a subject when taking the arm scye depth, location of waist line, length of coat, sleeve length, blade, strap and overshoulder measures for producing coat pattern drafts.

Fig. 2 is a fragmentary front elevational view of a measuring device embodying the invention positioned on a form showing the location of the measuring tapes thereof when taking the strap measure and overshoulder measure.

Fig. 3 is a fragmentary rear elevational view of a measuring device embodying the invention positioned on a form showing the location of the measuring tapes thereof when taking the scye depth, blade measure, strap measure and overshoulder measure.

Fig. 4 is a plan view of a measuring device embodying the invention positioned on a form showing the location of the measuring tapes thereof when taking the strap measure and overshoulder measure.

Fig. 5 is an enlarged fragmentary elevational view showing in detail a preferred construction of the right armhole section of a measuring device embodying the invention.

Referring particularly to the drawing wherein like numerals refer to like and corresponding parts throughout the several views, the embodiment of the invention disclosed therein comprises a vest-like measuring unit having two pairs of flexible armhole sections, each composed of front and rear flexible leather shields 10 and 11 secured in expansible relation to each other and into a vest-like measuring device by elastic bands 12. When positioned on a subject to be measured as indicated in Figs. 1 to 4 inclusive the measuring device is connected to the center of the rear of the shirt collar 13 of the subject by means of a suitable hook 14 preferably spaced by the tape 15 one and one-half inches above the upper rear horizontally disposed elastic band 12 of the said vest-like measuring device, the said measuring device being fastened together in the front thereof at the breast line of the subject by a suitable clasp 16 on the free ends of the front horizontal elastic bands 12.

As best shown in Fig. 5, the flexible leather shields 10 and 11 are each preferably constructed of two pieces of pliable leather sewed together in such a manner as to provide pockets into which the elastic bands 12 are anchored by such means as the stitching 17 at suitable distances from the edges of the said leather shields 10 and 11 to permit the vest-like measuring device to easily accommodate itself to various sized subjects without distortion.

A measuring tape 18 is secured to and depending from tape 15 with the zero point thereof at a working point 180 called "the nape of the neck" which is preferably one and one-half inches below the hook 14, the said tape 18 being slidably retained through a loop 19 in the center of the lower rear horizontally disposed elastic band 12.

A measuring tape 20 is pivotally secured to and depends from each of the front flexible leather shields 10 at a working point 21 thereon equivalent to a like working point established on a normal pattern draft, the said working point 21 being at the arm scye depth and level with the top of the lower front and rear horizontally disposed elastic bands 12.

When taking a set of measurements for a coat, the vest-like measuring device is placed on a subject as indicated in Fig. 1 with front and rear flexible leather shields 10 and 11 of each pair of flexible armhole sections snugly adjusted to the arm pit of the subject, with the hook 14 connected to the subject's shirt collar 13 at the top and center of the rear thereof, with the free ends of the front horizontal elastic bands 12 thereof fastened together by the clasp 16 at the breast line, with the measuring tape 18 depending from the nape of the neck working point 180 preferably 1½ inches below the top of the shirt collar 13 and through the loop 19 in the center of the lower rear horizontally disposed elastic band 12, and with a measuring tape 20 depending from the working point 21 on each of the front flexible leather shields 10.

The arm scye depth, location of waist line and length of coat measures are taken by the measuring tape 18 from the nape of the neck working point 180 which allows for the height of collar. The arm scye depth measure is taken at the top of the loop 19 of the rear lower horizontal elastic band 12. The waist line measure is taken at the trouser belt line of the subject which is indicated by the dash and two dot lines 22 in Fig. 1. The length of coat measure is taken to a point equivalent to the desired length of coat which is indicated by the dash and two dot line 23 in Fig. 1.

The sleeve length, blade, strap, and overshoulder measures are taken on each side of the subject in order that the pattern drafted therefrom may compensate for irregularities in the posture and physical attitude of the subject. The sleeve length measures are taken from the working points 21 to a point on each arm equivalent to the desired length of the coat sleeves which is indicated by the dash and two dot line 24 in Fig. 1. The blade measures are taken from the working points 21 to the center of the back at the loop 19 of the rear lower horizontal elastic band 12 with the measuring tapes 20 in a position as indicated by the dash and two dot lines 200 in Figs. 1 and 3. The strap measures are taken from the working points 21 to the nape of the neck working point 180 with the measuring tapes 20 in a position as indicated by the dash lines 201 in Fig. 1 and by the full lines 201 in Figs. 2, 3, and 4. The overshoulder measures are taken from the working points 21 to the top of the loop 19 of the rear lower horizontal elastic band 12 (from the working points 21 to the center of the back at the arm scye depth) with the measuring tapes 20 in a position as indicated by the dash and dot lines 202 in Fig. 1 and by the full lines 202 in Figs. 2, 3 and 4.

The length of coat and sleeve length measurements may be taken with the subject's coat in place over the measuring device, in which event, the length of coat and sleeve length are measured for tailoring the new coat identical to the satisfactory coat and sleeve length of a coat already worn by the subject at the same time the other measurements essential to tailoring a new coat to the postural and physical attitude are correctly taken.

Measurements showing the circumference of the subject at the waist and hips may be taken in the usual manner by ordinary measuring tape and used in conjunction with the arm scye depth, location of waist line, length of coat, sleeve length, blade, strap and overshoulder measures taken by the method and means hereinbefore described. The waist and hip circumferential measures do not reveal posture and physical attitude but do provide data from which the proper draping of a coat may be accomplished in conjunction with the disclosed novel method and means for taking measurements from which a coat may be drafted, cut and tailored to the postural and physical attitude of the subject. The invention is equally well adapted to taking measurements from which vests and overcoats may be tailored.

Although but one embodiment of the invention has been disclosed and described herein, it will be observed that various changes including the size, shape, arrangement and details of the various parts thereof may be made without departing from the spirit of the invention, and it is not intended to limit the scope thereof other than by the terms of the appended claims.

I claim:

1. In a vest-like measuring unit for taking measurements for coats and the like, two pairs of armhole sections secured together and into a vest-like unit by elastic bands, means for positioning said unit on a subject whereby a nape of the neck working point is automatically established in relation to the subject's shirt collar, working points established on the front section of each pair of armhole sections at the arm scye depth, and measuring tapes secured to said unit at said working points.

2. In a vest-like measuring unit for taking measurements for coats and the like, two pairs of armhole sections secured together and into a vest-like unit by elastic bands anchored in pockets formed in said armhole sections at suitable distances from the edges thereof to permit the said measuring unit to accommodate itself automatically to various sized subjects without distortion, means for positioning said unit on a subject whereby a nape of the neck working point is definitely established in relation to the subject's shirt collar, working points established on the front section of each pair of armhole sections at the arm scye depth, and measuring tapes secured to said unit at said working points adapted to take measurements therebetween.

GEORGE HURST.